United States Patent
Zhao et al.

(10) Patent No.: US 12,098,923 B2
(45) Date of Patent: Sep. 24, 2024

(54) METHODS AND APPARATUS FOR DYNAMIC OPTICAL FLOW SENSOR CALIBRATION BY IMU IN PLANAR ROBOT SYSTEMS

(71) Applicant: CEVA TECHNOLOGIES, INC., Mountain View, CA (US)

(72) Inventors: Zhanlue Zhao, Mountain View, CA (US); Yun Li, Mountain View, CA (US); Bryan A. Cook, Silver Spring, MD (US)

(73) Assignee: CEVA Technologies, Inc., Mountain View, CA (US)

( * ) Notice: Subject to any disclaimer, the term of this patent is extended or adjusted under 35 U.S.C. 154(b) by 245 days.

(21) Appl. No.: 17/618,996

(22) PCT Filed: Jun. 26, 2020

(86) PCT No.: PCT/US2020/039856
§ 371 (c)(1),
(2) Date: Dec. 14, 2021

(87) PCT Pub. No.: WO2020/264320
PCT Pub. Date: Dec. 30, 2020

(65) Prior Publication Data
US 2022/0299321 A1    Sep. 22, 2022

Related U.S. Application Data

(60) Provisional application No. 62/868,260, filed on Jun. 28, 2019.

(51) Int. Cl.
*G06T 7/269*    (2017.01)
*G01C 21/16*    (2006.01)

(52) U.S. Cl.
CPC ....... *G01C 21/1656* (2020.08); *G01C 21/183* (2020.08); *G06T 7/269* (2017.01)

(58) Field of Classification Search
CPC .. G01C 21/1656; G01C 21/183; G01C 21/16; G06T 7/269; G06T 2207/10016; G06T 2207/30244; G06T 2207/30252
USPC ......................................................... 382/276
See application file for complete search history.

(56) References Cited

U.S. PATENT DOCUMENTS

| | | | |
|---|---|---|---|
| 8,073,564 B2 | 12/2011 | Bruemmer et al. | |
| 8,692,896 B2 | 4/2014 | Masuda | |
| 9,152,915 B1 * | 10/2015 | Gabardos | G06N 3/049 |
| 10,254,118 B2 | 4/2019 | Roumeliotis et al. | |
| 2008/0249732 A1 | 10/2008 | Lee et al. | |

(Continued)

FOREIGN PATENT DOCUMENTS

| | | |
|---|---|---|
| WO | 2016187757 A1 | 12/2016 |
| WO | 2018129335 A1 | 7/2018 |

OTHER PUBLICATIONS

International Search Report/Written Opinion dated Nov. 6, 2020 in related/corresponding PCT Application No. PCT/US2020/039513.

(Continued)

*Primary Examiner* — Stephen P Coleman
(74) *Attorney, Agent, or Firm* — Patent Portfolio Builders PLLC

(57) ABSTRACT

Methods, apparatus, and systems are provided for calibrating an optical flow (OF) sensor by using an inertial measurement unit (IMU) measurements in a planar robot system.

18 Claims, 7 Drawing Sheets

(56) References Cited

U.S. PATENT DOCUMENTS

| | | | |
|---|---|---|---|
| 2011/0206236 A1* | 8/2011 | Center, Jr. | ............... G06T 7/593 382/103 |
| 2014/0104445 A1 | 4/2014 | Ramachandran et al. | |
| 2015/0248585 A1 | 9/2015 | Takeuchi et al. | |
| 2016/0005164 A1 | 1/2016 | Roumeliotis et al. | |
| 2017/0153122 A1 | 6/2017 | Tang et al. | |
| 2018/0075609 A1* | 3/2018 | He | ............................ G06T 7/20 |
| 2018/0364048 A1 | 12/2018 | Cook et al. | |
| 2018/0364731 A1 | 12/2018 | Liu et al. | |
| 2022/0299543 A1 | 9/2022 | Carlson et al. | |

OTHER PUBLICATIONS

International Search Report/Written Opinion dated Sep. 30, 2020 in related/corresponding PCT Application No. PCT/US2020/039856.
HowStuffWorks, article entitled "How Robotic Vacuums Work," Nov. 3, 2005, by Julia Layton, retrieved Nov. 28, 2023 from Internet: https://electronics.howstuffworks.com/gadgets/home/robotic-vacuum.htm.
Mehrdad Negahban and the University of Nebraska, 1996-2002, "Relative motion of points on a rigid body," http://emweb.unl.edu/NEGAH BAN/EM373/note15/note.htm, 2 pages.
Mingxiao He et al., "Enhanced Positioning Systems Using Optical Mouse Sensors," 2014, Springer International Publishing, Switzerland, pp. 463-474.
Paramvir Bahl et al., "RADAR: An In-Building RF-based User Location and Tracking System," 2000, IEEE Infocom. IEEE Computer and Communications Societies, pp. 775-784.
Ronald P.M. Chan et al., "Characterisation of Low-cost Optical Flow Sensors," 2010, 9 pages.
Thomas R. Kane et al., "Dynamics: Theory and Applications," 1985, pp. 1-402, New York, McGraw-Hill Book Company.
Wikipedia, The Free Encyclopedia, post entitled "Angular velocity," 6 pages, date of last revision Dec. 20, 2023 by Wikipedia contributors, retrieved Dec. 20, 2023 from Internet: https://en.wikipedia.org/wiki/Angular velocity.
Wikipedia, The Free Encyclopedia, post entitled "Pitch detection algorithm," 4 pages, date of last revision Sep. 22, 2022 by Wikipedia contributors, retrieved Nov. 28, 2023 from Internet: https://en.wikipedia.org/wiki/Pitchdetection algorithm.
Zhanlue Zhao et al., "Camera and IMU Frame Alignment in AR/VR Systems for Different Gyroscope Specifications," 4th International Conference on Sensors Engineering and Electronics Instrumentation Advances (SEIA' 2018), Sep. 19-21, 2018, Amsterdam, The Netherlands, 6 pages.
Extended European Search Report dated Jul. 10, 2023 in corresponding/related European Application No. 20833217.1.
Extended European Search Report dated Jul. 7, 2023 in corresponding/related European Application No. 20830725.6.
Javier Diaz et al., "FPGA-Based Real-Time Optical-Flow System," Transaction Letters, IEEE Transactions on Circuits and Systems for Video Technology, Feb. 2006, vol. 16, No. 2, pp. 274-279.
Volker Grabe et al., "A comparison of scale estimation schemes for a quadrotor UAV based on optical flow and IMU measurements," IEEE/RSJ International Conference on Intelligent Robots and Systems (IROS), Tokyo, Japan, Nov. 3-7, 2013, pp. 5193-5200.
Office Action dated Apr. 22, 2024 in corresponding/related Japanese Application No. 2021-577607.
Office Action dated Apr. 22, 2024 in corresponding/related Japanese Application No. 2021-577621.

* cited by examiner

METHODS AND APPARATUS FOR DYNAMIC OPTICAL FLOW SENSOR CALIBRATION BY IMU IN PLANAR ROBOT SYSTEMS

RELATED APPLICATION

This application is a National Stage of PCT/US2020/039856, filed on Jun. 26, 2020, which is related to, and claims priority from, U.S. Provisional Patent Application No. 62/868,260, entitled "Methods and Apparatus for Dynamic Optical Flow Sensor Calibration By IMU in Planar Robot Systems", filed on Jun. 28, 2019, the disclosure of which is incorporated here by reference.

BACKGROUND

It is becoming increasingly popular and widespread for electronic devices, especially mobile devices, such as cellular telephones, digital cameras, global positioning system (GPS) units, laptop and palmtop computers, automobiles, robotic vacuum cleaners, to include sensors (e.g., motion sensors) to provide enhanced functionality. For example, the sensors may include a gyroscope that measures angular velocities, an accelerometer that measures linear acceleration, and/or an optical flow (OF) sensor that measures the displacement of image features over time.

Planar robots (e.g., robotic vacuum cleaners or RVCs), which generally experience only planar movement, are booming. Inertial measurement unit (IMU) (or IMU sensor(s)) and OF sensor(s) are often used in a planar robot system (e.g., RVCs) for navigation and simultaneous localization and mapping (SLAM). The IMU, which may contain an accelerometer and a gyroscope, provides relative heading of the robot. The OF sensor provides velocity of the robot in the sensor frame. In some cases, the OF sensor measures displacement with respect to an underlying surface in the X-axis and Y-axis between two sampling points/images in the OF frame. Since the sampling rate is, most often, constant, the corresponding velocity can be readily obtained. Through dead-reckoning, the robot trajectory may be computed by updating its last position estimate, with the current velocity and heading measurements. Although, in theory, the velocity may be computed by integrating acceleration, the linear acceleration computed from the IMU may have a gravity residual and zero-gravity offset (ZGO) which results in an integration error. The integration error may increase as time goes. For an accelerometer having consumer-level accuracy, the computed trajectory may be out of shape after several seconds. Therefore, the OF sensor is valuable to provide the velocity. Even with an OF sensor, the computed trajectory may become out of shape after a while. In some cases, it may still benefit robot navigation when the error grows at a slower rate.

In some examples, an OF sensor may measure the displacement of image features over time. For example, an OF sensor may report a two-dimensional (2-D) displacement vector every time that it is sampled, representing the average number of feature pixels moved between consecutive sample images. In order to use these image-domain values, it is necessary to convert pixel distances to real-world distance(s) through calibration. For example, an OF sensor may output a 2-D pixel distance, and the OF sensor may need calibration to obtain an accurate velocity for use in navigation and mapping.

In some implementations, OF sensor manufacturers may provide a calibration guide to obtain one or more calibration parameters for sensor configurations and working conditions (e.g., a ground surface, a light source, and/or height of the OF sensor lenses). For example, the OF sensor manufacturers may use or apply static calibration procedures with known lighting source(s) and/or tracking surface(s). However, these calibration parameters vary based on differences in the ground surfaces or light sources (e.g., a laser or LED) or when the height of the OF sensor changes. For example, as the ground surface determines which light source is turned on, the calibration parameters may change as the ground surface changes.

It is, therefore, important for a robot (e.g., a planar robot) to dynamically calibrate the OF sensor and obtain accurate velocity estimates while navigating across heterogenous surfaces (e.g., rugs, tile, wood), and while adapting its illumination to obtain accuracy. For dead-reckoning navigation, sensor accuracy may drive the position error growth rate. Therefore, accurate calibration is useful to achieve high-accuracy operations.

SUMMARY

According to an embodiment, a method of calibrating an optical flow (OF) sensor by using an inertial measurement unit (IMU) in a robot system includes an IMU performing measurements to collect data and calibrating the optical flow sensor using that data, e.g., by calibrating one or more of optical flow scales, an alignment angle and/or displacement between the IMU and the OF sensor.

According to an embodiment, a robot system comprises an optical flow (OF) sensor, an inertial measurement unit (IMU) performing measurements to collect data and a processor calibrating the optical flow sensor using that data, e.g., by calibrating one or more of optical flow scales, an alignment angle and/or displacement between the IMU and the OF sensor.

According to an embodiment, an apparatus includes a processor, a transceiver, and one or more sensors, wherein one of the sensors collects inertial motion data and wherein the processor uses the inertial motion data to calibrate an optical flow sensor.

BRIEF DESCRIPTION OF THE DRAWINGS

A more detailed understanding may be had from the detailed description below, given by way of example in conjunction with drawings appended hereto. Figures in description, are examples. As such, the Figures and the detailed description are not to be considered limiting, and other equally effective examples are possible and likely. Furthermore, like reference numerals in the figures indicate like elements, and wherein.

DETAILED DESCRIPTION

Figure 1:
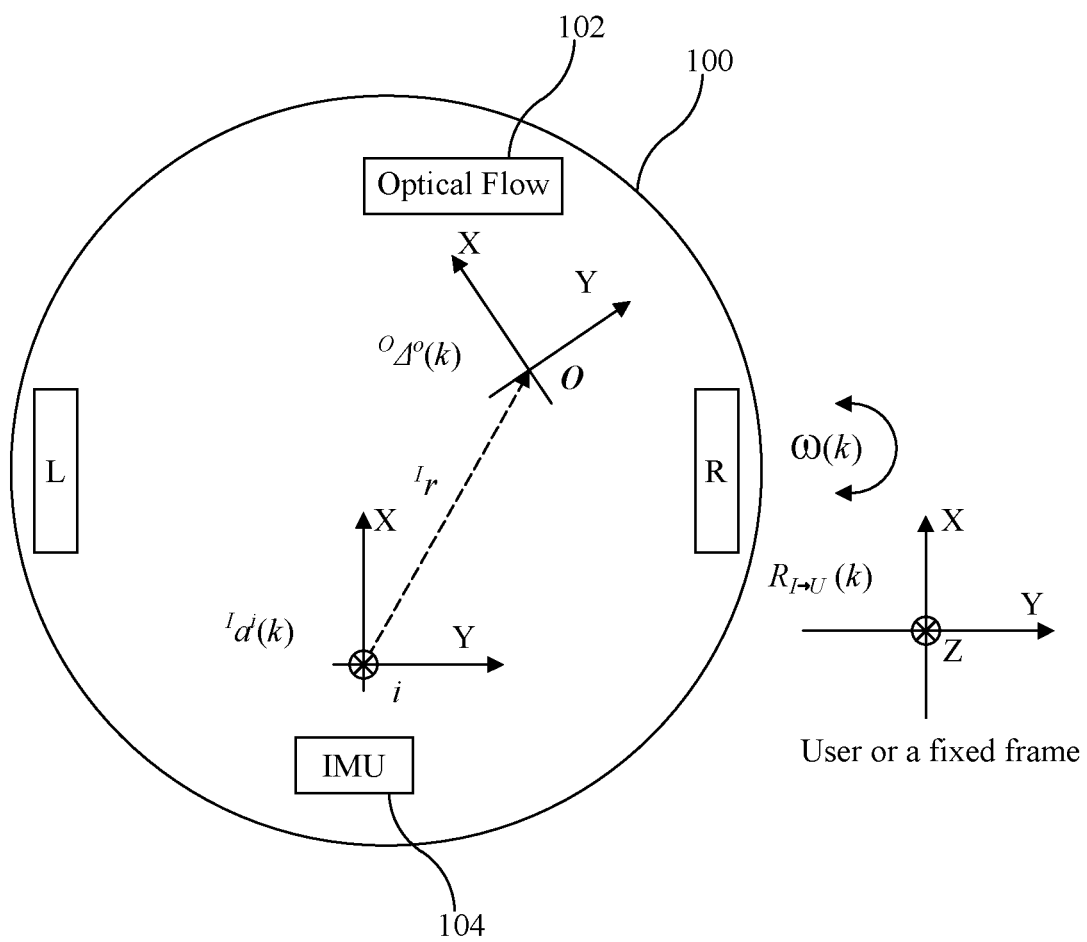
FIG. 1 is an exemplary planar robot system using measurements by an inertial measurement unit (IMU) and an optical flow (OF) sensor, in accordance with one or more embodiments.

The following detailed description of the invention refers to the accompanying drawings. The same reference numbers in different drawings identify the same or similar elements. Also, the following detailed description does not limit the invention. Instead, the scope of the invention is defined by the appended claims.

As noted above, an IMU may be used in a planar robot system, such as a robot vacuum cleaner, which may have an IMU that includes one or more accelerometers and/or gyroscopes, to provide heading information for use in controlling the robot. The robot also may include or incorporate other sensors, such as an OF sensor that measures the displacement of image features over time. The planar robot system may also have a controller, such as a processor, that has access to the data from all the sensors, and therefore, can calculate the robot's motion, and/or positional status. For example, if both the wheel encoder and the camera show no motion, and all the motors are idle, the controller may reasonably assume that the robot is stationary. In an example, the IMU may have its own processor and can output orientation.

In addition, the robot may include motors for causing the robot to move in any number of ways, including rotation about any axis and/or translation in any direction, and/or including rotation and translation of parts of the robot relative to other parts of the robot (e.g., mechanical arms that move relative to the main body of the robot). The controller also may be adapted to direct the motion of the robot by controlling the motors.

In various embodiments, the OF sensor and IMU may be on a same robot, so their angular velocity generally should be same, their kinematic parameters may be related, and it may be possible to calibrate one using the other. For example, the OF sensor and IMU may be on the same rigid body (e.g., a planar robot system) and the kinematic quantities (e.g. velocity) of the OF sensor and IMU may be related by rigid body equations. As such, the IMU may be used to calibrate optical flow, even if the OF sensor and IMU may be at different locations.

In an example, the controller (or other processing device) of the robot may use data from the IMU or IMU sensor(s) and/or the other sensors and components (e.g., cameras, wheel encoders) to improve the calibration of the OF sensor. In another example, the controller (or other processing device) may use data from the OF sensor to calibrate the IMU (e.g., gyro scale of the IMU) in a robot system.

As noted above, an IMU may contain at least an accelerometer and a gyroscope. In various embodiments, for example, the position of a planar robot system may be obtained through double integration of the acceleration. In some cases, the linear acceleration computed from the IMU may have error components in it, such as the gravity residual and ZGO. The integration error(s) may increase at a rate of the square of the time. Thus, for an accelerometer of consumer level accuracy, the computed trajectory may become sufficiently inaccurate so as to adversely affect performance within several seconds. Therefore, an OF sensor is valuable to provide the velocity. In some cases, even with an OF sensor, the computed trajectory may become too inaccurate after a certain time period. As such, for robot navigation, it is desirable to implement error correction schemes to slow the error growth rate.

In various embodiments, if the OF sensor accuracy is good enough, the OF sensor may be used to calibrate the IMU as well, for example, using the OF sensor to calibrate gyroscope scale of the robot system (see, e.g., Applicant Reference No. 14745US01 filed on Jun. 28, 2019, herewith by Applicant and entitled "METHODS AND APPARATUS FOR MUTUAL GYROSCOPE SCALE AND OPTICAL FLOW SENSOR SCALE CALIBRATION THROUGH OPTICAL FLOW IMAGE QUALITY METADATA").

In various embodiments, OF sensor calibration may be achieved by relating the IMU measurements to OF sensor measurements so that the IMU measurements and the OF sensor measurements are comparable so that they can be used to calibrate each other. In an example, the position, velocity and acceleration as measured by an IMU (or derived from its measurements) at one spot of the robot generally should be the same as the corresponding values measured or derived by the OF sensor (with the possible exception of rotational velocity and acceleration depending on the relative positions of the OF and IMU on the rigid body of the robot), if the IMUs and OF sensor are ideal and without any errors. In practice, there are many error sources that can cause the measured position, velocity and acceleration by IMUs (or derived by their measurements) to be very different from the true values thereof and/or from the corresponding values measured or derived by the OF sensor. In various embodiments, these error sources may be identified, and may be circumvented and/or filtered out so that values of the measurements (or values derived from the measurements) obtained or performed by IMUs and OF sensors are comparable. In various embodiments, when performing OF sensor calibration, optimization formulations with efficient computation algorithms may be devised to obtain calibration parameters in real time.

In various embodiments, an IMU may be used or configured to calibrate an OF sensor in a planar robot system. In an example, a general formulation may be used for the calibration. In various embodiments, multiple formulation options are disclosed. Various embodiments are disclosed to obtain calibration parameters in the position domain, velocity domain, and/or acceleration domain, or in the IMU frame under various conditions (e.g., ideal conditions). In some implementations, one or more formulations may not hold in practice or be applied due to errors. In various embodiments, practical error sources associated with a sensor system are identified, and methods/mechanisms developed for circumventing or filtering out those errors are disclosed. In various embodiments, efficient real-time algorithms for computing system calibration parameters may be used, for example, in a planar robot system.

In various embodiments, a planar robot system may use the IMU to calibrate the OF sensor. The process or procedure may be formulated in the user frame (e.g., earth frame of reference or a fixed frame with respect to the earth) or body frame (the robot's frame of reference, or the IMU or OF frame). In various embodiments, one or more mechanisms may be applied to minimize the fitting errors by using a search algorithm (e.g., fminsearch function in Matlab) or a Least Squared process/function. To overcome or circumvent the measurement errors, special preprocessing may be necessary. In some examples, real time calibration may be provided.

Nomenclature and terms used in various embodiments may be found in the following table:

I IMU body frame;
i Location of the IMU on the robot;
O OF sensor body frame;
o Location of the OF sensor on the robot;
U The user frame;
ω The angular velocity of the robot as [0 0 $ω_z$];
$^I r$, $^U r$ The displacement in the IMU frame and User frame, respectively;
$^I a^i$ The acceleration at the location of IMU in the IMU frame I;
$^O Δ^o$ The OF measurement at the location of OF sensor in the OF sensor frame;
$R_{I→U}$ The rotation rotates from IMU frame I to the user frame U;
$R_{O→I}$ The rotation rotates from OF frame to the IMU frame;
$^I v^i$ The velocity at the location of IMU in the IMU frame;
$^O v^o$ The velocity at the location of OF sensor in the OF frame;
$^u p^i$, $^u v^i$, $^u a^i$ The position, velocity and acceleration of the location of IMU sensor in the user frame;
$^u p^o$, $^u v^o$, $^u a^o$ The position, velocity and acceleration of the location of OF sensor in the user frame; and
$^I p^i$, $^I v^i$, $^I a^i$ The position, velocity and acceleration of the location of IMU in the IMU frame.

In various embodiments, a robot (e.g., an RVC) system may have two wheels (left and right) driven by two independent motors. FIG. 1 is an exemplary robot system 100 in accordance with various embodiments, e.g., an RVC system. The optical flow (OF) sensor 102 and IMU 104 may be installed on convenient locations as illustrated in FIG. 1. The IMU 104 may contain an accelerometer and a gyroscope, which, collectively, measure the acceleration $^I a^i(k)$ at the location of the IMU 104, the angular velocity ω(k), and the angular position $R_{I→U}(k)$ of the IMU 104, which is also the angular position of the whole robot (e.g., the RVC) system 100, e.g., the angular position of the robot system/IMU frame relative to the user frame (e.g., the earth frame or a fixed frame). In an example, in $^I a^i(k)$ and $R_{I→U}(k)$, I and U may be referred to as the IMU frame and the user frame, respectively; i is the location of the IMU 104; k is the discrete time. The user frame may be defined as the plane of motion for the robot system 100. One or more embodiments or methods disclosed herein may be applied to planar robot motion in order to calibrate or recalibrate the transformation between the two frames of reference. The bold terms or parameters found in the variables used herein are or include at least a matrix and/or a vector, which can be found from the context disclosed herein. For example, if A or A is a quantity, then A stands for a vector or a matrix, and A stands for a scalar. The OF sensor 102 may measure the pixel motion in the OF body frame, which is the relative distance (between (A) and (B)) that the sensor moves from (A) the last time the register is read to (B) the current time the register is read. When sampled with a constant period, the OF sensor 102 may be treated as a velocity sensor. The measurement is represented as $^O Δ^o(k)=[Δ_x(k)\ Δ_y(k)]$ in the OF body frame. $^I r$ is the displacement from the IMU 104 to the OF sensor 102 in the IMU frame. Note that, $^I r$ is constant in the IMU frame. In the user frame, the displacement from the IMU 104 to the OF sensor 102 is $^U r = R_{I→U}\ ^I r$, which is changing as $R_{I→U}$ changes.

In various embodiments, with a 2×2 calibration matrix Λ, which may calibrate the scale and skew, and the biased offset correction B, the OF sensor may provide the linear velocity in the OF body frame as:

$$^O v^o(k) = Λ *^O Δ^o(k) + B$$

In an example, the calibration matrix Λ may be decomposed as Λ=R*Scale*Skew. R is a rotation matrix, Scale is a diagonal matrix, and Skew is an upper triangular matrix. Skew is caused by non-orthogonal axes. For example, if axis-X and axis-Y are orthogonal, Skew may be an identity matrix. Otherwise, the upper off diagonal terms would be non-zero.

In various embodiments, since the biased offset of the OF sensor is, most often, negligible. The offset B may be dropped. In this case, the OF sensor 102 may provide the linear velocity in the OF body frame as:

$$^O v^o(k) Λ *^O Δ^o(k)$$

In various embodiments, although the OF body frame and IMU body frame may be different, there exists a constant rotation $R_{o→I}$ to align them, for example:

$$^I v^o(k) = R_{o→I} *^O v^o(k)$$

Therefore, $$^I v^o(k) = R_{o→I} *^O v^o(k) = R_{o→I} Λ *^O Δ^o(k) = A *^O Δ^o(k)$$

Where $A = R_{o→I} Λ$, which converts the OF measurements into the velocity in the IMU frame.

Together with the rotation matrix $R_{I→U}(k)$, the velocity of the robot system in the user frame is:

$$^U v^o(k = R_{I→U}(k) A *^O Δ^o(k) \quad (1)$$

From $^U v^o(k)$, the trajectory of the robot system in the user frame may be computed as:

$$^U p^o(k) = Σ^u v^o(k)*T + ^U p^o(0) = Σ R_{I→U}(k) A *^O Δ^o(k)*T + ^U p^o(0)$$

Therefore, the IMU and OF may estimate the trajectory of the robot system.

In various embodiments, for the calibration, the robot system 100 may need to find the calibration matrix A and $^I r$ through a function, with inputs of the IMU measurements and OF sensor measurements, such as $^O Δ^o$, $^I a^i$, ω, and/or $R_{I→U}$. In some cases, $R_{o→I}$ and Λ may be computed through matrix decomposition of A.

In various embodiments, in order to use IMU(s) 104 to calibrate an OF sensor 102, IMU measurements may need to be related to (e.g., be associated with or comparable to) OF measurements. In an example, as the OF measurements are in velocity, the robot system 100 may use velocity as the measurements for calibration. For example, according to the rigid body equation:

$$^U v^o = ^U v^i + ^U ω × ^U r$$

where $^U v^o$ and $^U v^i$ are the velocity at the location o and i, respectively, in the user frame. $^U r$ is the displacement from the location i to o in the user frame. $^U ω$ is the angular velocity of the rigid body in the user frame. "×" stands for vector cross multiplication. In an example, $^U ω$ and $^I ω$, the angular velocity in the IMU frame, are the same as $[0,0, ω_z]$ in the planar case, where $•_z$ is the angular velocity around z-axis. In this example, ω is used to denote both situations.

In various embodiments, the velocity at the location of IMU 104 is $^U v^i(k)$, which may be computed by the acceleration $^I a^i(k)$ and a constant initial velocity $v_0$, such as:

$$^U v^i(k) = Σ_{j=0}^{k}(R_{I→U}(j) *^I a^i(j)*T) + v_0$$

The velocity at the location of the OF sensor 102 is $^{U}v^{o}(k)$ as shown in Equation (1). In one embodiment, variables in the rigid body equation may be replaced with the values derived from the IMU 104 and the OF sensor measurements, obtaining (as shown in Equation (2) below):

$$R_{I \to U}(k) A *^{O}\Delta^{o}(k) = {}^{U}v^{i}(k) + \omega(k) \times R_{I \to U}(k) *{}^{I}r \qquad (2)$$

In one embodiment, for example, the calibration process may include finding or determining A and $^{I}r$ so that the OF measurements and the IMU measurements satisfy the equation (e.g., approximately).

In an example, using Equation (2), an optimization objective function may be defined as:

$$J(A, {}^{I}r) = \sum_{k} \left\| {}^{U}v^{i}(k) + \omega(k) \times R_{I \to U}(k) *{}^{I}r - R_{I \to U}(k) A *{}^{O}\Delta^{o}(k) \right\|$$

where $\| \ \|$ stands for the L2 norm of a vector. In another example, any p-norm may be applied in Equation (2).

In various embodiments, for example, A and $^{I}r$ may be found or determined based on:

$$[\hat{A}, {}^{I}\hat{r}] = \min_{A, r} J(A, {}^{I}r)$$

In an example, A and $^{I}r$ may be determined via a standard nonlinear optimization. For example, in some tools (e.g., Matlab or Python), A and $^{I}r$ may be found or determined as following:

fminsearch($J(A,{}^{I}r),(A,{}^{I}r)$)

or scipy.optimize.fmin($J(A,{}^{I}r),(A,{}^{I}r)$)

In various embodiments, in addition to relating the IMU measurements and the OF sensor measurements in the velocity domain, there are multiple ways to relate or link the IMU measurements and the OF sensor measurements to find the calibration matrix A. In an example, in the user frame, according to the rigid body equation, the position $p^{o}$ and $p^{i}$, velocity $v^{o}$ and $v^{i}$, and acceleration $a^{o}$ and $a^{i}$ at the location o and the location i on a rigid body are related as below:

$${}^{U}p^{o} = {}^{U}p^{i} + {}^{U}r$$

$${}^{U}v^{o} = {}^{U}v^{i} + \omega \times {}^{U}r$$

$${}^{U}a^{o} = {}^{U}a^{i} + \omega \times (\omega \times {}^{U}r) + \dot{\omega} \times {}^{U}r$$

where $\omega$ is the angular velocity and $^{U}r$ is the displacement from the location i to the location o in the user frame. In some cases, the variables in the above rigid body equations can be derived from the OF sensor measurements and IMU measurements.

Further, the corresponding rigid body equations in the body/IMU frame are:

$${}^{I}p^{o} = {}^{I}p^{i} + {}^{I}r$$

$${}^{I}v^{o} = {}^{I}v^{i} + \omega \times {}^{I}r$$

$${}^{I}a^{o} = {}^{I}a^{i} + \omega \times (\omega \times {}^{I}r) + \dot{\omega} \times {}^{I}r$$

where $\dot{\omega}$ is the derivative of $\omega$.

Similarly, by replacing the variables $p^{o}$, $p^{i}$, $v^{o}$, $v^{i}$, $a^{o}$, and $a^{i}$ in the above rigid body equations with the IMU measurements and/or the OF sensor measurements, and/or their derived values, the relationship between the IMU measurements and the OF sensor measurements may be established, and the corresponding solutions of the calibration parameters may be derived. For example, one or more of the above rigid body equations may help establish equations with unknown calibration parameters, and the corresponding solutions are to solve at least one of the equations and obtain the values of the calibration parameters.

In various embodiments, any of the domain of acceleration, the domain of velocity, and the domain of position may be used for calibration of the OF sensor 102. In an example, the noise level may be a primary consideration when choosing or selecting a domain, e.g., from the domains of acceleration, velocity, and position. Since the derivative of linear velocity may significantly amplify the embedded noise, the derived acceleration may be much noisier. Moreover, OF sensor measurement glitches and occlusion may cause a great deal of discontinuity, which may exacerbate derivative errors. As such, in some implementations, formulating in the acceleration domain may be less attractive. In some cases, the integration upon acceleration has a much smoother curve. Although any direct-current (DC) component, e.g., zero-gravity offset (ZGO) component, in the acceleration domain may cause the integration to diverge quickly, this can be cured by using one or more appropriate filters. In various embodiments, formulating in velocity and/or position domain may be more feasible in view of one or more reasons noted above.

In addition, both the OF sensor 102 and IMU(s) 104 are on the robot 100, and their measurements are in their body frames, respectively, which can be aligned by a fixed rotation matrix. In an example, directly working in body frame(s) may simplify the calibration process.

Formulations in Position, Velocity, and/or Acceleration Domains and the IMU Frame In various embodiments, specific formulation and corresponding process(es)/mechanism(s) in the position, velocity, and/or acceleration domain are presented. In an example, the relationship between the IMU measurements and the OF sensor measurements may be established in the position domain, velocity domain, and/or acceleration domain, respectively, in the IMU frame. The corresponding process(es)/mechanism(s) are also presented, for example, a Least Squares (LS) process/mechanism. In another example, the relationship may be established in the user frame as well by applying the rotation matrix to both sides of the rigid body equations (e.g., the corresponding rigid body equations disclosed above) in IMU or body frame.

Velocity Domain

In various embodiments, for example, the rigid body equation in the velocity domain and body frame is:

$${}^{I}v^{i} = {}^{I}v^{o} - \omega \times {}^{I}r \qquad (3)$$

At time $k$, $${}^{I}v^{o}(k) = A *{}^{O}\Delta^{o}(k)$$

where A converts the OF measurements into the velocity in the IMU frame.

In an example, $^{I}v^{i}(k)$ may not be available directly but can be derived from the IMU measurements as:

$${}^{I}v^{i}(k) = R_{I \to U}(k)' (\Sigma_{j=0}^{k} R_{I \to U}(j) *{}^{I}a^{i}(j) * T + {}^{U}v^{i}(0))$$

The initial velocity $^U v^i(0)$ is a constant. Therefore, Equation (3) becomes:

$$^I v^i(k) = A *^O \Delta^o(k) - \omega(k) \times {}^I r \quad (4)$$
$$= \begin{bmatrix} a_{11} & a_{12} \\ a_{21} & a_{22} \end{bmatrix} {}^O \Delta^o(k) - \begin{bmatrix} 0 & -\omega(k) \\ \omega(k) & 0 \end{bmatrix} {}^I r$$
$$= \begin{bmatrix} a_{11} & a_{12} & r_y \\ a_{21} & a_{22} & -r_x \end{bmatrix} \begin{bmatrix} {}^O \Delta^o(k) \\ \omega(k) \end{bmatrix}$$

where $A = \begin{bmatrix} a_{11} & a_{12} \\ a_{21} & a_{22} \end{bmatrix}, {}^I r = \begin{bmatrix} r_x \\ r_y \end{bmatrix}$.

For example, when using a Least Squares solution/mechanism:

$$\text{Let } X = \begin{bmatrix} {}^O \Delta^o(1) & \cdots & {}^O \Delta^o(k) \\ \omega(1) & \cdots & \omega(k) \end{bmatrix},$$

$$\Psi = \begin{bmatrix} a_{11} & a_{12} & r_y \\ a_{21} & a_{22} & -r_x \end{bmatrix}, \text{ and } Y = \begin{bmatrix} {}^I v^i(1) & \cdots & {}^I v^i(k) \end{bmatrix}, \text{ then}$$

$$Y = \Psi X$$

In an example, X and Y are available or provided from the OF sensor measurements and IMU measurements. $\Psi$ is the total set of calibration parameters.

Using the Least Squares mechanism, the result(s) may be obtained or determined by:

$$\hat{\Psi} = YX'(XX')^{-1}$$

For example, when the zero-rotation offset (ZRO), zero-gravity offset (ZGO), uncanceled gravity components, and/or other sensor errors are insignificant, the result(s) may be obtained directly. Otherwise, these errors could cause Equation (3) not to hold. In some cases, special preprocessing may be necessary, which is discussed in the DC-Block Filter Design section below.

Matrix Polar Decomposition and Calibration Matrix

In various embodiments, once $\Psi$ is obtained, then A is obtained, and the calibration matrix may be derived by the matrix polar decomposition. The polar decomposition of a square matrix is matrix decomposition of the form:

$$A = \Omega \Lambda$$

where $\Omega$ is a rotation matrix and $\Lambda$ is a positive-semidefinite symmetric matrix. To compute the polar decomposition, assuming that the singular value decomposition of A is $$A = UDV'$$

Then $$\Omega = UV'$$

$$\Lambda = VDV'$$

The rotation matrix $\Omega$ rotates the OF frame to the IMU frame. $\Lambda$ is the calibration matrix to convert the relative pixel motion to the speed in the OF sensor frame.

Position Domain

In various embodiments, for example, the rigid body equation in the position domain and body frame is:

$$^I p^i = {}^I p^o - {}^I r$$

At time $k$, $$^I p^o(k) = R_{I \to U}(k)' \Sigma_{j=0}^k (R_{I \to U}(j) A *^O \Delta^o(k)) * T$$

$$^I p^i(k) = R_{I \to U}(k)' \Sigma_{j=0}^k \Sigma_{j=0}^k (R_{I \to U}(j) {}^I a^i(j)) * T^2$$

In an example, for simplicity, the initial position and velocity may be assumed to be zero.

The Objective Function is $$J(A, r) = \Sigma_k \| {}^I p^i(k) - {}^I p^o(k) + {}^I r \|$$

In one embodiment, the result(s) may be obtained or determined by:

$$[\hat{A}, \hat{r}] = f\text{minsearch}(j(A, r), (A, {}^I r))$$

Acceleration Domain

In various embodiments, for example, the rigid body equation in the acceleration domain and body frame is:

$$^I a^i = {}^I a^o - \omega \times (\omega \times {}^I r) - \dot{\omega} \times {}^I r$$

$^I a^i(k)$ is measured by the IMU directly. For simplicity, denote $^O \Delta^o(t)$. As derived in Appendix A.1 below, $$^I a^o(k) = A \dot{\Delta}(k) + \begin{bmatrix} 0 & -\omega_z \\ \omega_z & 0 \end{bmatrix} A \Delta(k)$$

The Objective Function is:

$$J(A, r) = \Sigma_k \| {}^I a^o(k) - \omega(k) \times (\omega(k) \times {}^I r) - \dot{\omega}(k) \times {}^I r - {}^I a^i(k) \|$$

In one embodiment, the result(s) may be obtained or determined by:

$$[A, r] = f\text{minsearch}(J(A, r), (A, {}^I r))$$

In various embodiments, the position, velocity, and/or acceleration measured or derived by the OF sensor are, most often, very different from the corresponding values measured or derived by the IMU measurements, due to various errors. In an example, four main error sources are identified. These errors may be circumvented or filtered out to obtain a reliable calibration matrix.

In one embodiment, the IMU and OF sensor measurements may not be time aligned. In one embodiment, the integration of the acceleration may always diverge due to gravity residual contained in the linear acceleration or ZGO. In one embodiment, the OF sensor measurements may be noisy and different from the inertial measurements due to occlusion or glitches. To enhance the robot system 100, new or improved mechanisms may be desired to find reliable calibration matrix.

Moreover, in various embodiments, the formulations disclosed above may be for 2-D free motion. For planar robots, due to the robot motion being constrained by its wheels (that can only move forward or backward), the above formulation(s) may not have unique solutions or mechanisms. For example, some calibration parameters may not be estimable directly from the above formulation(s). A feasible mechanism to address this issue is being investigated and disclosed herein.

In various embodiments, for example, it may be assumed that in a planar robot system, the axis-Z of the robot, IMU, and OF sensor are all aligned with the user frame axis-Z. The alignment error or uneven floor surface may break this assumption and/or may introduce tilt error(s). A further embodiment discloses in detail how various different sources of tilt error may be handled.

Measurement Time Alignment

In various embodiments, for example, it may be necessary to align the timing of the IMU and OF sensor measurements first. The linear acceleration derived by the OF sensor may be the derivative of its measurements. The asynchronous sampling between the IMU acceleration and the derived OF acceleration may be found through finding the maximum of the cross-correlation between their norms. Given two signals x and its delayed one y, the time delay between the two signals may be determined via:

$$est(n) = \arg\max_n (x \star y)[n]$$

Where (x*y)[n] is the cross-correlation.

DC-Block Filter Design

In various embodiments, $^I a^i(k)$ may contain ZGO and gravity components, which are constant over time, that is, DC components. Integration or cumulative sum of $^I a^i(k)$ may accumulate such error(s) and make it incomparable to the OF signal.

DC-Block Filter

A DC-block filter allows the time varying signal to pass and blocks the DC component of the signal. To overcome the integration divergence due to the ZGO and gravity components, a DC-block filter may be applied before integration to remove the ZGO and gravity components from and/or after integration to remove DC error accumulated during integration, so that only the signal variation is kept. An example DC-block filter may be a recursive filter specified by the difference equation:

y(n)=(x(n)−x(n−1))(1+a)/2+a·y(n−1)

Figure 2:
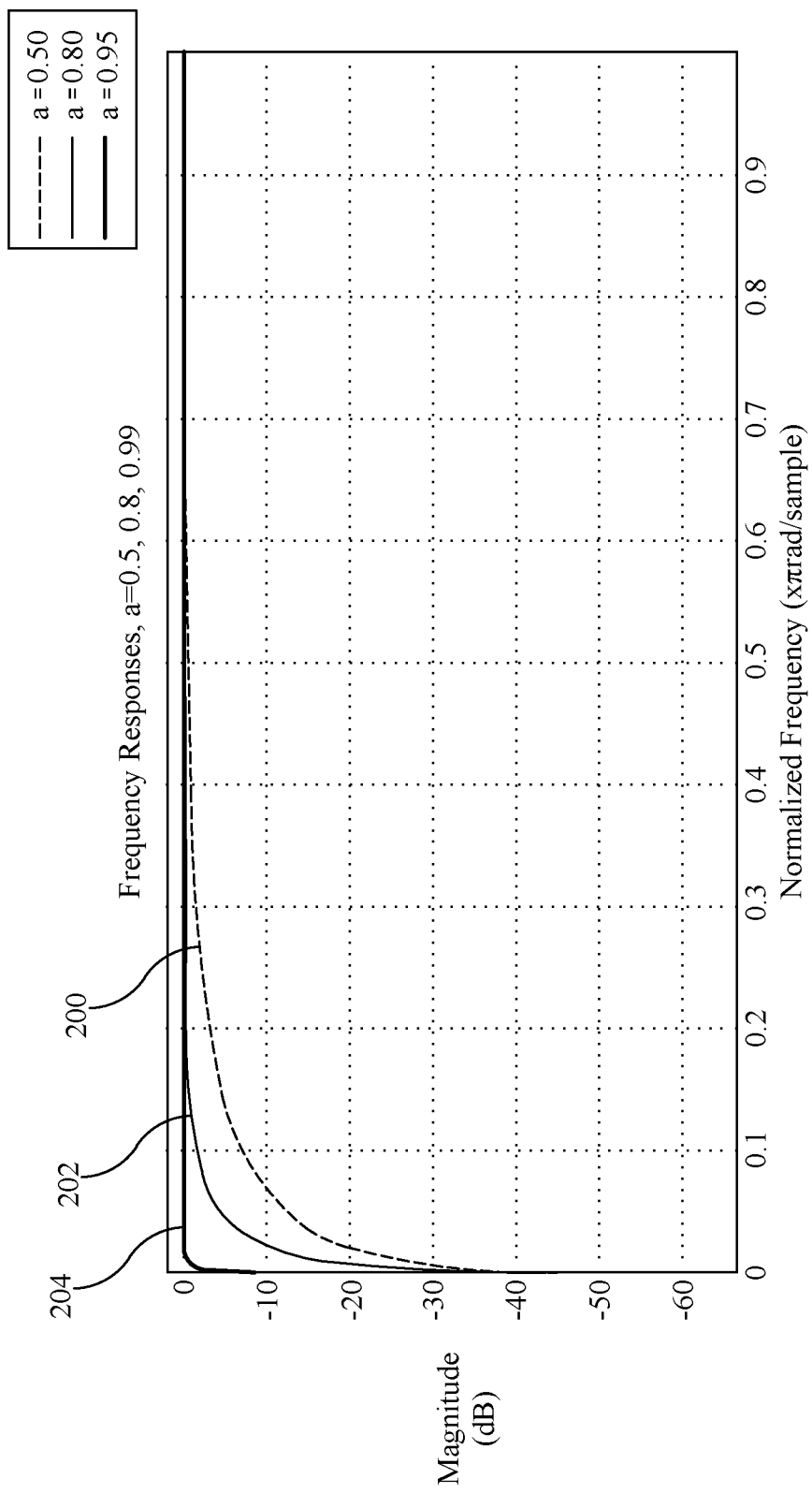
FIG. 2 is a graph illustrating multiple direct-current (DC) block filter frequency responses, in accordance with one or more embodiments.

FIG. 2 is a graph that illustrates DC-block filter frequency responses when a=0.5, a=0.8, a=0.99, respectively. In various embodiments, the DC-block filter may be applied in the body frame or user frame to filter out the undesired DC signal components, e.g., ZGO and/or gravity components.

Apply to the Formulation(s) in Velocity Domain and Body Frame

In an example, to apply the DC-block filter in the Equation (4), $$^I v^i(k) = \Psi * \begin{bmatrix} ^O\Delta^o(k) \\ \omega(k) \end{bmatrix}$$

First, compute the DC-blocked linear velocity from IMU, $^I v^{i\_fDCB}(k) = R_{U \to I}(k) * f_{DCB}(\Sigma_{j=0}^k (R_{I \to U}(j) * f_{DCB}(^I a^i(j))) * T)$ The innermost $f_{DCB}(*)$ is to remove the ZGO, which is constant in the body frame. The outside $f_{DCB}(*)$ is to remove the accumulated error(s) due to the integration. Another $f_{DCB}(*)$ may be applied to $R_{I \to U}(j) f_{DCB}(^I a^i(j))$ if the gravity component is significant, which is constant in the user frame.

The same DC-block filter is applied to the OF and angular velocity measurements as well. In an example, similar as to apply for $^I a^i$ disclosed above, $$\begin{bmatrix} R_{U \to I}(k) f_{DCB}(R_{I \to U}(k) f_{DCB}(^O\Delta^o(k))) \\ f_{DCB}(f_{DCB}(\omega(k))) \end{bmatrix}$$

Rotating the OF measurements $^O\Delta^o(k)$ to the user frame after the first $f_{DCB}$, and rotating back to the body frame after the second $f_{DCB}$, is to guarantee that $$\begin{bmatrix} ^O\Delta^o(k) \\ \omega(k) \end{bmatrix}$$

is regulated in the same way as the IMU acceleration measurements. Angular velocity ω(k) is the same in the user frame as in the body frame. Therefore, $f_{DCB}$ has been applied twice, which means the same DC-block filter is being applied upon the OF and angular velocity measurements. When no significant DC components appears in the OF measurements after the first DC-block filter in the user frame, e.g., $R_{I \to U}(k) f_{DCB}(^O\Delta^o(k))$, which may appear true, the DC-block filter may be applied as below:

$$f_{DCB}\left(f_{DCB}\left(\begin{bmatrix} ^O\Delta^o(k) \\ \omega(k) \end{bmatrix}\right)\right)$$

In various embodiments, this may be a key process to bridge the gap between a theoretical formulation and a practical implementation, when the ZGO and/or gravity components are significant.

In an example, after applying the DC-block filter(s), the equation (4) becomes:

$$^I v^{i\_fDCB}(k) = \Psi * \begin{bmatrix} R_{U \to I}(k) f_{DCB}(R_{I \to U}(k) f_{DCB}(^O\Delta^o(k))) \\ f_{DCB}(f_{DCB}(\omega(k))) \end{bmatrix}$$

or $$^I v^{i\_fDCB}(k) = \Psi * f_{DCB}\left(f_{DCB}\left(\begin{bmatrix} ^O\Delta^o(k) \\ \omega(k) \end{bmatrix}\right)\right)$$

The corresponding Least Squares mechanism may be applied or derived similarly as disclosed above. Note, however, that the two previous equations imply that the calibration problem using a DC-block filter can still be formulated as a Least Squares problem, but this is true only for certain special situations, i.e., when matrix A is commutable with a rotation matrix, that is, when matrix A is an identity matrix (same scale in x and y). This issue is discussed in more detail below and dealt with according to some embodiments by adding a special location 2-scale calibration algorithm which is also described below.

Figure 4:
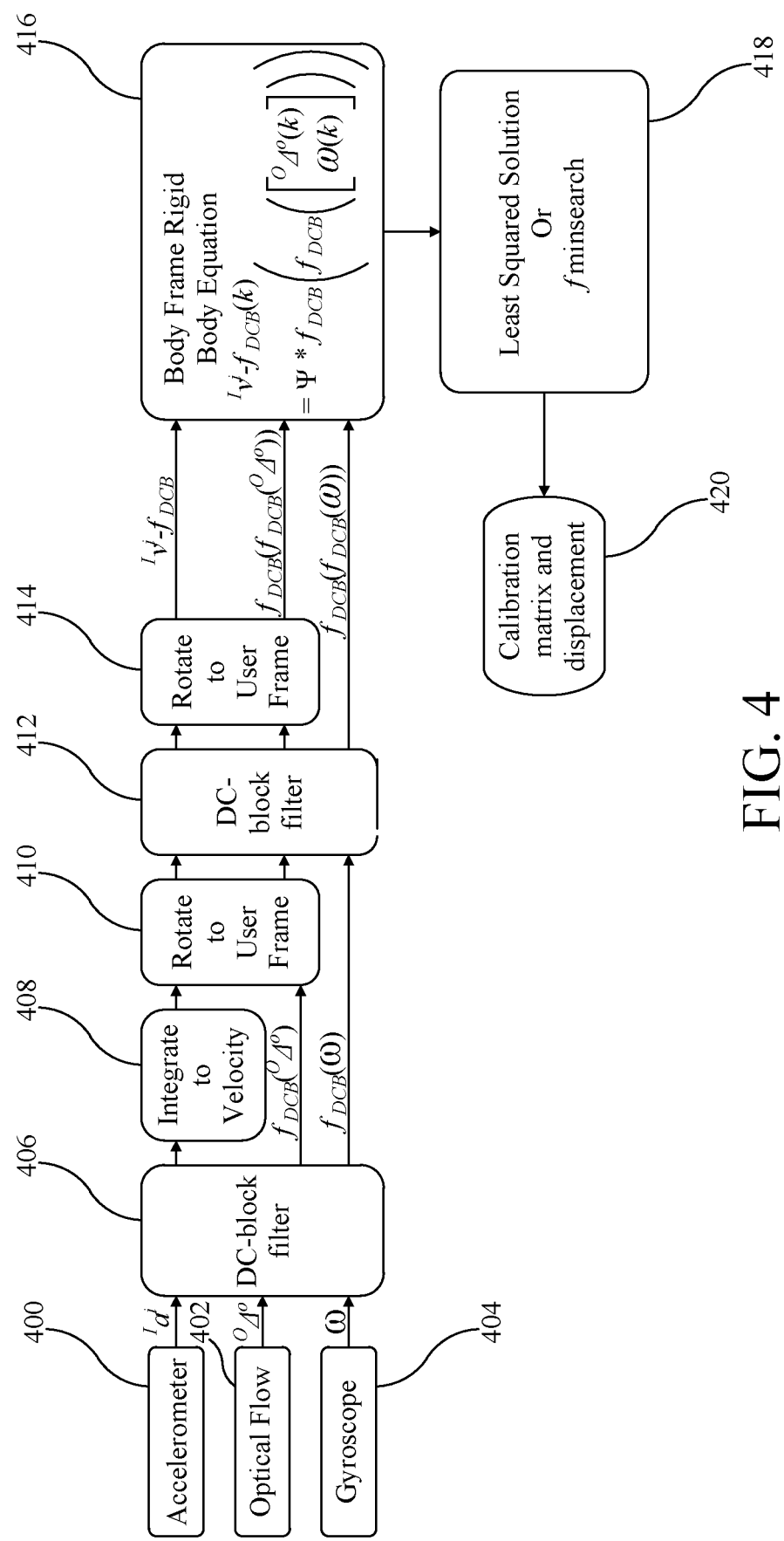
FIG. 4 is a flow diagram of an exemplary mechanism in the body frame of a robot system in velocity domain, in accordance with one or more embodiments.

The entire flow applying the foregoing formulations in the velocity domain and in the body frame is shown in FIG. 4. Therein, the accelerometer 400, optical flow sensor 402 and gyroscope 404 output acceleration data, optical flow data and angular velocity data, respectively, which is filtered by the DC-Block filter 406. The filtered acceleration data is integrated to determine the robot's linear velocity at block 408. The linear velocity data and optical flow data are rotated to the user frame at block 410. The rotated linear velocity data and optical flow data, as well as the angular velocity data, are filtered again at a second DC-Block filter 412, after which the linear velocity data and optical flow data are rotated back into the body frame at block 414. The resulting linear velocity, optical flow and angular velocity data are input into the body frame rigid body equation described above at block 416. Then the calibration matrix can be determined at block 418, e.g., using the Least Squares solutions or fminsearch techniques described herein, after which the calibration matrix and/or displacement value can be output to be used to calibrate the optical flow sensor.

Apply to the Formulation(s) in Velocity Domain and User Frame

In various embodiments, in the user frame for the Equation (2), the rigid body equation in velocity domain indicates:

$R_{I \to U}(k) A *^O\Delta^o(k) = ^U v^i(k) + \omega(k) \times R_{I \to U}(k) *^I r$ And the velocity at the location of the IMU may be derived as (e.g., by fminsearch, $f\text{minsearch}(J(A, {}^Ir),(A, {}^Ir))$):

$${}^Uv^i(k)=\Sigma_{j=0}^k(R_{I\to U}(j)*{}^Ia^i(j)-g_{xy})*T+v_0$$

Apply DC-block filter as below:

$${}^Uv^{i\_fDCB}(k)=f_{DCB}(\Sigma_{j=0}^k(f_{DCB}(R_{I\to U}(j)*{}^Ia^i(j)-g_{xy}))*T)$$

where $g_{xy}$ are the gravity components in the x-y plane. If the robot's plane of motion is level, $g_{xy}$ may be [0, 0]. In an example, the calibration objective function may be defined as:

$$J(A, {}^Ir) = \sum_k \left\| {}^Uv^{i\_fDCB}(k) + f_{DCB}\left(f_{DCB}(\omega(k)\times R_{I\to U}(k)*{}^Ir - R_{I\to U}(k)A*{}^O\Delta^o(k))\right)\right\|$$

The above objective function may be solved similarly by, for example, fminsearch as disclosed above, such as:

$$f\text{minsearch}(j)(A,{}^Ir),(A,{}^Ir))$$

In another example, the velocity at the location of the OF sensor may be derived as:

$${}^Uv^o(k)=\Sigma_{j=0}^k(R_{I\to U}(j)*{}^Ia^o(j)-g_{xy})*T+v_0$$

and with the rigid body equation at the acceleration domain:

$${}^Ia^o(k) = ({}^Ia^i(k) + \omega(k)\times(\omega(k)\times {}^Ir) + \dot\omega(k)\times {}^Ir$$

then $$R_{I\to U}(k)A*{}^O\Delta^o(k) =$$

$$\sum_{j=0}^k (R_{I\to U}(j)*({}^Ia^i(j) + \omega(j)\times(\omega(j)\times {}^Ir) + \dot\omega(j)\times {}^Ir) - g_{xy})*T + v_0$$

Apply DC-block filter as below:

$$f_{DCB}(f_{DCB}(R_{I\to U}(k)A*{}^O\Delta^o(k))) =$$

$$f_{DCB}\left(\sum_{j=0}^k f_{DCB}\left((R_{I\to U}(j)*(({}^Ia^i(j) + \omega(j)\times(\omega(j)\times {}^Ir) + \dot\omega(j)\times {}^Ir) - g_{xy})\right)*T\right)$$

Denote $${}^Uv^{o\_fDCB}(k) =$$

$$f_{DCB}\left(\sum_{j=0}^k f_{DCB}((R_{I\to U}(j)*({}^Ia^i(j) + \omega(j)\times(\omega(j)\times {}^Ir) + \dot\omega(j)\times {}^Ir))*T\right)$$

In an example, the objective function may be defined as:

$$J(A, {}^Ir) = \sum_k \left\|{}^Uv^{o\_fDCB}(k) - f_{DCB}(f_{DCB}(R_{I\to U}(k)A*{}^O\Delta^o(k)))\right\|$$

The above objective function may be solved similarly by, for example, fminsearch as disclosed above, such as:

$$f\text{minsearch}(j(A,{}^Ir),(A,{}^Ir))$$

Figure 5:
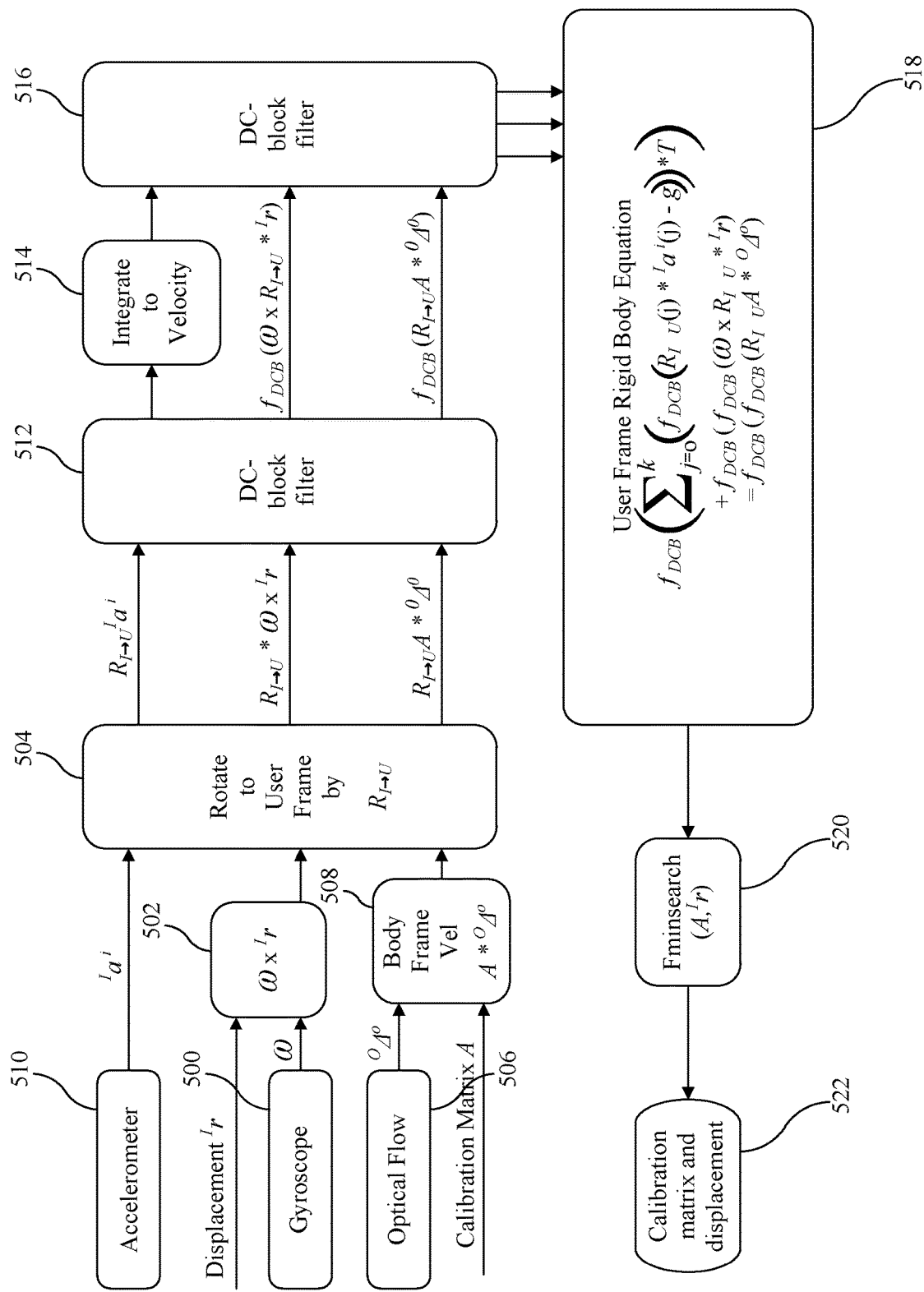
FIG. 5 is a flow diagram of an exemplary mechanism in the user frame of a robot system in velocity domain, in accordance with one or more embodiments.

FIG. 5 illustrates the foregoing formulations in the velocity domain and in the user frame. Therein, the gyroscope outputs data associated with the angular velocity of the robot at block 500. The angular velocity is multiplied with the current IMU/OFS displacement value at block 502, the result of which is output toward the rotate to user frame block 504. Output from the optical flow sensor is provided by block 506 to calculate the body frame velocity of the robot (according to the optical data) using the current calibration matrix at block 508, the result of which is output toward the rotate to user frame block 504. The linear acceleration of the robot, as measured by the accelerometer 510, is also provided to the rotate to user frame block 504. Then, the linear acceleration, body frame velocity and the multiplication result of the angular velocity times the current displacement are all rotated into the user frame at block 504. The three rotated results are then filtered at DC-block filter 512. The filtered linear acceleration value, now in the user frame of reference, is then integrated at block 514 to obtain the robot's linear velocity as measured by the IMU, which linear velocity value is sent to the second DC-block filter 516, along with the processed data from the gyroscope 500 and optical flow sensor 506. The three filtered outputs from block 516 are used as inputs to the user frame rigid body equation at block 518, from which the calibration matrix and displacement 522 can be determined using, e.g., fminsearch 520.

Selecting Relevant Measurements

In various embodiments, the measurements (e.g., IMU measurements and/or OF sensor measurements) may not carry certain information and/or enough information to calibrate the OF sensor, for example, when the robot system is stationary, or OF sensor occlusion happens. In those situations, the computed calibration matrix may not be credible and/or accurate. Therefore, selecting the proper measurements to feed into a proper algorithm is important. For example, for the formulations in the body frame, the measurements may need to meet one or more of the following conditions to be selected:

A. $\|f_{DCB}({}^Ia^i)\|$>Threshold-1, and/or

B. $\|f_{DCB}(\omega)\|$>Threshold-2

In various embodiments, the Threshold-1 and/or Threshold-2 may be pre-configured and/or learned from real data (e.g., real-time data). In an example, condition A is to make sure the robot is not stationary or not at the constant velocity. When the robot system rotates, the displacement impacts the sensor measurements. In some cases, the displacement ${}^Ir$ may be estimated or determined under condition B.

To obtain a reliable optical flow calibration using IMU data as a reference, both the optical flow signal (e.g. linear velocity) and the IMU data (e.g. linear acceleration) should be accurate. Optical flow velocity sometimes has glitches, and sometimes has zero output. Although the optical flow sensor 102 has a "sensor quality" output, it is neither sufficient nor necessary for the velocity output to be reliable. Linear acceleration from the IMU 104 may also have occasional saturation or glitches. If either the optical flow velocity or the IMU linear acceleration is not reliable, the optical flow calibration accuracy deteriorates greatly. Therefore, a detection regarding the quality of the optical flow signal and IMU signal is needed.

When optical flow velocity ${}^O\Delta^o$ is calibrated by some fair default or initial calibration (like a 2-scale only calibration within 20% error) to get ${}^Ov^o$, then the user frame DC-blocked version of it, ${}^Uv^{o\_fDCB}$, should match with the user frame DC-blocked version of linear velocity, ${}^Uv^{i\_fDCB}$ obtained from IMU 104 as described in equations.

$${}^Uv^{o\_fDCB}(k)=f_{DCB}(R_{I\to U}(k){}^Ov^o(k)) \qquad (5)$$

$${}^Uv^{i\_fDCB}(k)=f_{DCB}((\Sigma_{j=0}^k(R_{I\to U}(j){}^Ia^i(j))*T+R_{I\to U}(j)(\omega(j)\times\Delta r)) \qquad (6)$$

with $\text{err}(k)=\|{}^Uv^{o\_fDCB}(k)-{}^Uv^{i\_fDCB}(k)\|$.

The norm of the difference between the two equations shows how well they match each other; and is a good indicator of the quality of optical flow velocity and IMU linear acceleration. When this error exceeds a threshold, that means one or both of the two input signals has a problem; and should not be used for calibration.

Please note that there are different ways of applying the DC block filter, as long as the overall filter response is kept the same in both Eq (5) and Eq (6). In practice we found that applying the DC block filter twice, once before integration and once after integration, works better than applying once, because the first filter removes the DC component in linear acceleration, and the second filter removes the error accumulation in linear velocity.

Unique Robot Motion and Its Solution

Figure 3:
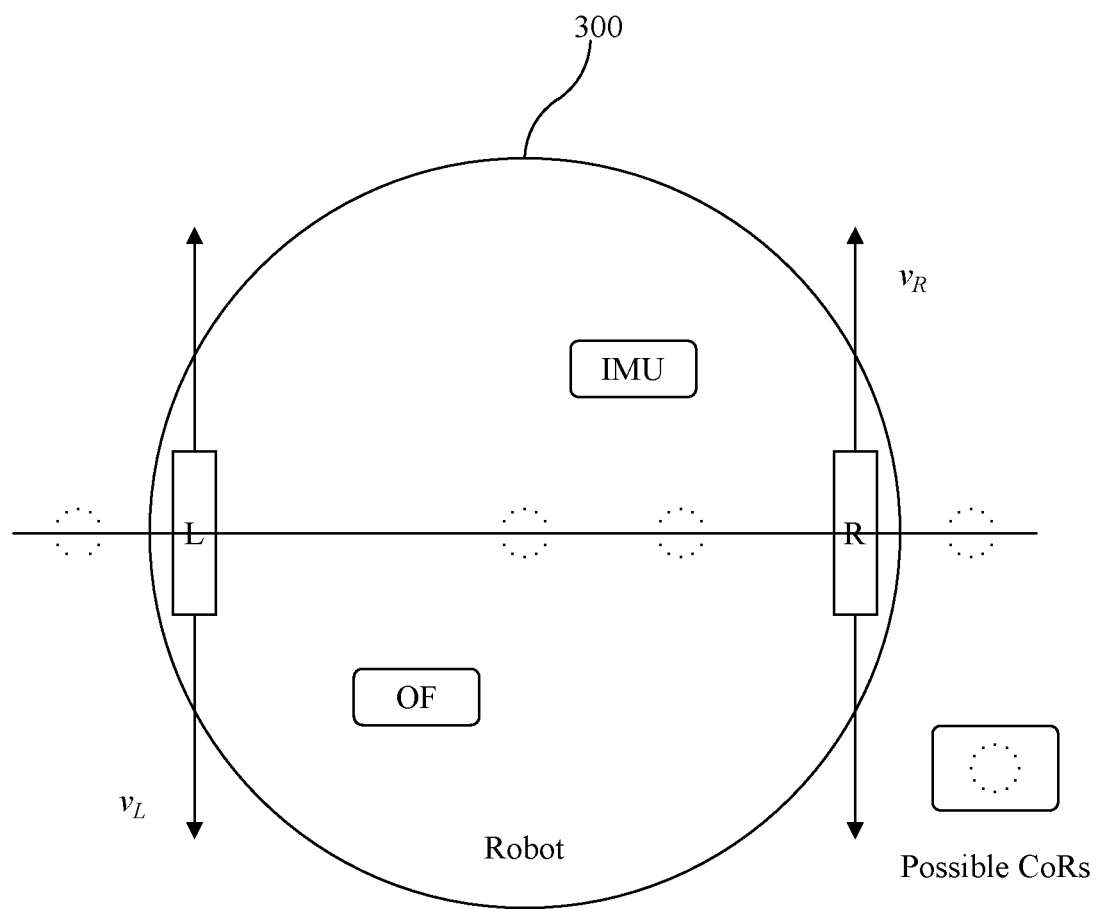
FIG. 3 is an exemplary robot system having robot motion(s) with two wheels and one or more centers of rotation (CoRs), in accordance with one or more embodiments.

FIG. 3 is an exemplary robot system 300 (e.g., a planar robot system, or an RVC system) having robot motion(s) with two wheels and one or more centers of rotation (CoRs), in accordance with one or more embodiments. In current implementations for most planar robot systems, wheels may only move forward or backward, which are driven by independent motors. Therefore, the planar robot systems can move only in certain ways. In addition, the two wheels of the planar robot system may run at different speeds. If there is no slipping of the wheels relative to the surface of operation, and when the two wheels run at a same speed and in a same direction, the planar robot system moves straight forward or backward without any rotation. When the two wheels run at a same speed but in opposite directions, the planar robot system may rotate around its center. When the two wheels are not running at a same speed, the robot 300 will have a CoR that is not the center of the robot. However, unless the wheels slip on the surface of operation, the CoR will be constrained to always be somewhere along the line formed by connecting the center of the two wheels, as shown in FIG. 3. This constraint can be proved as follows in an example. In this example, for an arbitrary CoR, the path of travel of any point P would be a circle with the center at the CoR and includes point P. The travel direction along the circle for each point would be the tangent to the circle. To avoid slipping, the direction of travel must be perpendicular to the wheel axis direction. The only points that are perpendicular to the travel direction of both wheels are in the line connecting both of the wheels.

In various embodiments, the mechanism(s) and/or solution(s) used herein for the formulations may be different, depending on the set of calibration parameters in the robot motion and/or in a planar robot system. In a first example, when the OF sensor 102 and IMU 104 are collocated at a same location, the displacement may become zero. In this example, the robot system 100 may only need to estimate the calibration matrix. For example, the mechanism used may be:

$$^I v^i(k) = A *{}^O \Delta^o(k)$$

For the above configuration, the calibration matrix is unique.

In a second example, if the OF sensor 102 and IMU 104 are located at different places, the robot system 100 may decompose the estimation of the calibration matrix and displacement in two operations. For example, in the first operation, only the calibration matrix A is estimated. In the second operation, the displacement r is estimated.

Operation 1: since $^I p^o = {}^I p^i + {}^I r$ and $^I r$ is constant, apply DC-block filter on both sides, $$^I p^{i\_DCB} = {}^I p^{o\_fDCB}$$

In some examples, integrating the velocity to get position(s) may need to be performed in the user frame. However, for a planar case where the device tends to rotate with a constant angular velocity, and using the DC-block filter, it turns out $^I p^o$ may be approximated in the body frame as, for example:

$$^I p^o = A \Sigma_{j=0}^k {}^O \Delta^o(k) * T$$

Let $\Delta^{fDCB} = f_{DCB}(\Sigma_{j=0}^k {}^O \Delta^o(k) * T)$ $$^I p^{i\_fDCB} = A \Delta^{fDCB}$$

$^I p^{i\_fDCS}$ may be derived from the IMU measurements. Therefore:

$$\hat{A} = \Delta^{fDCB} * {}^I p^{i\_fDCB'} * inv({}^I p^{i\_fDCB} * {}^I p^{i\_fDCB'})$$

Operation 2: once A is estimated, since $^I v^i = A\Delta - \omega \times {}^I r$, and $$\omega \times {}^I r = \begin{bmatrix} 0 & -\omega_z \\ \omega_z & 0 \end{bmatrix} \begin{bmatrix} {}^I r_x \\ {}^I r_y \end{bmatrix} = \omega_z \begin{bmatrix} -{}^I r_y \\ {}^I r_x \end{bmatrix}$$

Then $$\begin{bmatrix} -{}^I r_y \\ {}^I r_x \end{bmatrix} \omega_z = \hat{A}\Delta^{fDCB} - {}^I v^{i\_fDCB}$$

When stacking a sequence of the measurements together, the estimate of displacement may be:

$$\begin{bmatrix} -{}^I \hat{r}_y \\ {}^I \hat{r}_x \end{bmatrix} = \left(\hat{A}\Delta^{fDCB} - {}^I v^{i\_fDCB}\right) \omega^{fDCB'} * inv\left(\omega^{fDCB} \omega^{fDCB'}\right)$$

In a third example, if the OF sensor has a same scale parameter along x-axis and y-axis, and has no skew between two axes, for example, $$A = R_{O \to I} \cdot \Lambda = s \cdot R_{O \to I} = s \cdot \begin{bmatrix} \cos(\theta) & \sin(\theta) \\ -\sin(\theta) & \cos(\theta) \end{bmatrix}$$

Equation (3) becomes:

$$\begin{aligned}
^I v^i(k) &= A *{}^O \Delta^o(k) - \omega(k) \times {}^I r \\
&= \begin{bmatrix} s*\cos(\theta) & s*\sin(\theta) \\ -s*\sin(\theta) & s*\cos(\theta) \end{bmatrix} {}^O\Delta^o(k) - \begin{bmatrix} 0 & -\omega(k) \\ \omega(k) & 0 \end{bmatrix} {}^I r \\
&= \begin{bmatrix} \Delta_x(k) & \Delta_y(k) & 0 & \omega_z \\ \Delta_y(k) & \Delta_x(k) & -\omega_z & 0 \end{bmatrix} \begin{bmatrix} s*\cos(\theta) \\ s*\sin(\theta) \\ {}^I r_x \\ {}^I r_y \end{bmatrix}
\end{aligned}$$

Let $X = \begin{bmatrix} \Delta_x(k) & \Delta_y(k) & 0 & \omega_z \\ \Delta_y(k) & \Delta_x(k) & -\omega_z & 0 \end{bmatrix}$, $\Psi = \begin{bmatrix} s*\cos(\theta) \\ s*\sin(\theta) \\ {}^I r_x \\ {}^I r_y \end{bmatrix}$, $$^I v^i(k) = X\Psi$$

The above formulation may have a unique solution and can be solved as a LS problem. s is the norm of $\Psi(1:2)$. In an example, the above formulation may be for an ideal case where $^I v^i(k)$ is available directly. In another example (e.g., for a practical case) where linear acceleration integration and DC block filters are needed, the robot system may be configured to replace ${}^I v^i(k)$ with ${}^I v^{i\_fDCB}(k)$ (e.g., similar as in the section related to applying to the formulation in velocity domain and body frame discussed below).

$${}^I v_{DCB}{}^i(k) = R_{U \to I}(k)(\Sigma_{j=0} fDCB^k(R_{I \to U}(j){}^I a^i(j))*T)$$

In order to achieve a same filtering effect on both sides of the equation, $(A*{}^O\Delta^o(k))$ and $(\omega(k) \times {}^I r)$ may need to be filtered by the DC block filter in the user frame. In an example, the robot system may be configured to define function $g_{DCB}(u)$ for a vector u as to rotate vector u into user frame first, then DC block filter is configured to filter it in user frame, and then rotate it back:

$$g_{DCB}(u) = R_{U \to I}(k) f_{DCB}(R_{I \to U}(k) \cdot u).$$

In an example, if the DC block filter is done in another fixed frame, which is only a fixed rotation around z-axis away ($R_Z$) from the user frame, the result may be the same:

$$g_{DCB}(u) = (R_{U \to I} R_Z)' \cdot f_{DCB}(R_{U \to I} R_Z \cdot u) = R_z' \cdot g_{DCB}(R_z \cdot u)$$

In an example, when using this property with $R_Z R_{O \to I}$, the DC blocked version of $(A*{}^O\Delta^o(k))$ becomes:

$$g_{DCB}(A \cdot {}^O\Delta^o(k)) = s \cdot g_{DCB}(R_{O \to I} \cdot {}^O\Delta^o(k)) = s \cdot R_{O \to I} g_{DCB}({}^O\Delta^o(k)) = A \cdot g_{DCB}({}^O\Delta^o(k)) = A \cdot {}^O\Delta_{DCB}{}^o(k)$$

Referring to the comments relative to the above discussion, in various embodiments, for example, the matrix A may be pulled out only when the calibration matrix A is an identity matrix multiplied by a scalar (e.g., the scale in x-axis and y-axis are the same and the skew is zero). This is the case in this example. In general, A can not be pulled out from $g_{DCB}(A*{}^O\Delta^o(k))$, and therefore the equation with DC block filters cannot be formulated as a LS problem anymore.

For the $(\omega(k) \times {}^I r)$ term, when using $g_{DCB}(\omega(k) \times {}^I r)$, the calibration parameter ${}^I r$ may not be separated from the input parameter $\omega(k)$. In order to separate ${}^I r$ from the DC block filter, the following may be performed:

$$\text{Let } {}^I r = \begin{bmatrix} {}^I r_x \\ {}^I r_y \end{bmatrix} = r \begin{bmatrix} \cos \varphi \\ \sin \varphi \end{bmatrix}, \text{ and define } R'(\varphi) = \begin{bmatrix} \cos \varphi & \sin \varphi \\ -\sin \varphi & \cos \varphi \end{bmatrix},$$

which is a rotation around z, then $R'(\varphi) \cdot {}^I r = r \cdot \hat{x}$, where $\hat{X} = [1\ 0]'$, which is the unit vector along x-axis.

In an example, by using the aforementioned property of $g_{DCB}()$ with $R_Z = R(\varphi)$, the robot system may obtain:

$$g_{DCB}(\omega \times {}^I r) = R(\varphi) \cdot g_{DCB}(R(\varphi)' \cdot \omega \times {}^I r) = r \cdot R(\varphi) \cdot g_{DCB}(\omega \times \hat{x})$$

If $g_{DCB}(\omega \times \hat{x}) = \begin{bmatrix} g_x(\omega) \\ g_y(\omega) \end{bmatrix}$, then $$g_{DCB}(\omega \times {}^I r) = \begin{bmatrix} {}^I r_x & -{}^I r_y \\ {}^I r_y & {}^I r_x \end{bmatrix} \cdot \begin{bmatrix} g_x \\ g_y \end{bmatrix} = \begin{bmatrix} g_x(\omega) & -g_y(\omega) \\ g_y(\omega) & g_x(\omega) \end{bmatrix} \cdot \begin{bmatrix} {}^I r_x \\ {}^I r_y \end{bmatrix}.$$

With the DC blocked version of all 3 terms available, the equation becomes:

$${}^I v_{DCB}^j(k) = g_{DCB}(A \cdot {}^O\Delta^o(k)) - g_{DCB}(\omega \times {}^I r) =$$

$$\begin{bmatrix} \Delta_{DCB,x}(k) & \Delta_{DCB,y}(k) & -g_x(\omega) & g_y(\omega) \\ \Delta_{DCB,y}(k) & -\Delta_{DCB,x}(k) & -g_y(\omega) & -g_x(\omega) \end{bmatrix} \begin{bmatrix} s*\cos(\theta) \\ s*\sin(\theta) \\ {}^I r_x \\ {}^I r_y \end{bmatrix}$$

-continued $$\text{Let } X = \begin{bmatrix} \Delta_{DCB,x}(k) & \Delta_{DCB,y}(k) & -g_x(\omega) & g_y(\omega) \\ \Delta_{DCB,y}(k) & -\Delta_{DCB,x}(k) & -g_y(\omega) & -g_x(\omega) \end{bmatrix}, \Psi = \begin{bmatrix} s*\cos(\theta) \\ s*\sin(\theta) \\ {}^I r_x \\ {}^I r_y \end{bmatrix},$$

$${}^I v_{DCB}^j(k) = X\Psi$$

The following fourth example, is one way to address the issue that if the x and y scale are different, then the equation with user frame DC block filters cannot be formulated as a LS problem anymore. According to an embodiment, a Least Square algorithm for a 2-scale-only calibration with a special sensor arrangement can be employed. By doing integration and DC block filtering in the IMU/OF frame directly, the rotation matrix is skipped, and thus the least squares formulation remains valid. Assume the following:

The optical flow and IMU sensors are both perfectly aligned with the robot frame.

The skew between x and y axis is zero. The only parameters that need to calibrate are the x-axis scale $p_x$ and y-axis scale $p_y$. The calibrated optical flow velocity is obtained from the measurement as $$^O v^o = \begin{bmatrix} p_x & 0 \\ 0 & p_y \end{bmatrix} \cdot {}^O\Delta^o$$

Both optical flow 102 and IMU 104 sensors are located along the symmetric line between two wheels (x-axis) with known displacement ${}^I r^i$ and ${}^I r^o$ respectively in the IMU/OF frame. And the optical flow displacement vs IMU is $\Delta r = {}^I r^o - {}^I r^i$.

Given these assumptions, when the robot 100 drives straight (without turning), there is only x-axis velocity, and can be used to calibrate x-axis scale. The y-axis velocity can only exist when the robot 100 rotates. Especially, when robot 100 rotates around its center, there is only y velocity. This way, the calibration of y-scale can be separated from the calibration of x-scale, and each chose its own relevant part of motion.

When the robot 100 is driving forward or backward, the user frame and body frame are exactly the same, therefore it is the same integration and filtering in either frame. For simplicity, all operations are performed in the body frame. Using a rigid body assumption, the linear acceleration of IMU is the same as that of the optical flow. Then, the following is true $$\int {}^I a^i dt = {}^O v^o \quad (7)$$

A DC block filter can be added on both sides of the integration to remove the DC component of error accumulation caused by integration. This motion can only be used for x-scale calibration. When the robot is rotating around its center with angular velocity $\omega$, which is measured by the gyroscope of IMU, the optical flow velocity and IMU linear acceleration would be:

$$^O v^o = \omega \times {}^I r^o$$

$$^I a^i = -\omega^2 \cdot {}^I r^i + \dot{\omega} \times {}^I r^i$$

Integrating ${}^I a^i$ in the body frame directly, and using relationship $\Delta r = {}^I r^o - {}^I r^i$ gives:

$$\int {}^I a^i dt + \omega \times \Delta r + (\int \omega^2 dt) \cdot {}^I r^i = {}^O v^o \quad (8)$$

Therein, the second term is the adjustment for displacement between IMU and optical flow, the third term is the centripetal correction. Eq (7) is a special case of Eq (8) with $\omega=0$. With known IMU location $^I r^i$ and optical flow displacement vs IMU $\Delta r$, a DC block filter can be added to all the terms and the least square format remains valid. After the processing in Eq (6), the DC blocked $^O v^o$ and DC-blocked $^O \Delta^o$ can be used to solve the scales. The x and y component work independently for the x-scale and y-scale calibration, and can be solved separately. Please note that Eq (8) is true only when the rotation center is the robot center. If the rotation center is not at the center (e.g., one of the wheels), then the x-component of Eq (8) is still equal, but the y-component of Eq (7) are unequal. However, the least square solution using Eq (8) still provides the correct y-scale, just with less accuracy.

Tilt Error Correction

In various embodiments, the z-axis of the robot system, the IMU(s), and/or the OF sensor may not be aligned with the user frame z axis (e.g., for various reasons or sources), and the effects from the various sources (e.g., various sources of errors) to the robot system may be different.

One source of error may be a sloped floor (e.g., ramp) surface that causes the robot rotating axis to not align with the user frame z axis. As the robot system is aligned with IMU and OF sensors, the measured angular velocity is in the body frame z-axis. In an example, the motion may be on a tilted plane (and in some cases, the user frame may be also a tilted, but fixed frame), and the formulations may be still correct on the tilted motion plane. In some cases, the gravity measured by the IMU may have x and y axis component(s) on top of the z axis component, and thus the gravity cancelation may need to work or apply for all axes.

Another potential source of error may be an OF assembly error that causes its z axis to not align with the robot's z axis. In this situation, the motion plane may be not perpendicular to the OF optical axis, and the scale and/or skew may change. In an example, since the OF sensor may only provide a 2-D measurement of its displacement with respect to the underlying surface, there is no information about this tilt from the displacement measurement. Because the scale error caused by this tilt (e.g., less than a few degrees) is small compared to other error sources, in some cases, the scale error may be ignored in the calibration process.

Another possible source of error may be an assembly error of the IMU that causes its z axis to not align with robot's z axis. In this situation, the measured angular velocity by the IMU is not on the robot's z axis. In an example, this tilt (e.g., a rotation from a current IMU frame to an RVC frame) may be obtained from the measured average rotation axis over multiple rotations, and the found or obtained tilt may be used to de-tilt both angular velocity and linear acceleration. In another example, the robot system may de-tilt the angular velocity by using the gravity information to find out the tilt of the accelerometer, and de-tilt the linear acceleration. Then the de-tilted version of the IMU measurements may be used for further processing.

After overcoming the above challenges, the velocity domain solution embodiments in the body frame and user frame are summarized in FIG. 4 and FIG. 5, respectively.

Although only the embodiments in the body frame and user frame in the velocity domain are presented above, the mechanisms (in the body frame or user frame) in the acceleration domain and/or position domain can be developed in a similar manner. In various embodiments, when applying DC-block filters, the DC-block filter may be applied before rotating the sensor measurements to the user frame, or after rotating the sensor measurements to the user frame, or both, which may depend on (e.g., primarily on) where the unwanted DC components appear.

Real Time Dynamic Calibration

In various embodiments, the displacement is a constant once it is found. Assuming $^I r$ is known or pre-determined, the problem may be expressed as:

$$^I v^{i\_fDCB} + \omega^{fDCB} \times ^I r = A\Delta^{fDCB}$$

where $^I v^{i\_fDCB} + \omega^{fDCB} \times ^I r$ and $\Delta^{fDCB}$ may be derived from the sensor measurements. When dynamically estimating the calibration parameters, the most recent measurements should carry more weights since the values of the calibration parameters could vary due to floor surfaces changing. The most recent measurements are more relevant the current calibration parameter values. In an example, a forgetting factor is introduced to phase out the stale sensor measurements (e.g., the IMU and/or OF sensor measurements that are out-of-date). The problem of estimating the calibration matrix A with a forgetting factor may be formulated as:

$$\hat{A} = \arg\min_{A} \sum_{j=1}^{k} \lambda^{N-k} \left\| ^I v^{i\_fDCB}(j) + \omega^{fDCB}(j) \times ^I r - A\Delta^{fDCB}(j) \right\|^2$$

Let $z_k = {}^I v^{i\_fDCB}(j) + \omega^{fDCB}(j) \times {}^I r$ and $x_k = \Delta^{fDCB}(j)$ $$\hat{A} = \arg\min_{A} \sum_{j=1}^{k} \lambda^{N-k} \|z_k - Ax_k\|^2$$

This fits the least-squared estimation problem, and a real-time recursive solution is provided (e.g., as below in the following section related to recursive Least-Squared solution).

Recursive Least-Squared Solution

In various embodiments, it is assumed that the measurement model is:

$$z_k = x_k A + v_k$$

where A is a n×m matrix, $x_k$ is a 1×n vector, and $z_k$ and $v_k$ are 1×m vectors. $v_k$ is the noise. The recursive least square solution for A at $k^{th}$ observation is:

$$K_k = \lambda^{-} P_{k-1} x'_k / (1 + \lambda^{-1} x_k P_{k-1} x'_k)$$

$$P_k = \lambda^{-1} P_{k-1} - \lambda^{-1} K_k x_k P_{k-1}$$

$$\hat{A}_k = \hat{A}_{k-1} - P_k x'_k x_k \hat{A}_{k-1} + P_k x'_k z_k$$

where $\lambda$ (0<$\lambda$<1) is the forget factor, $\hat{A}_0$ is initialized as a zero vector or matrix, $P_0$ is initialized as a diagonal matrix $\delta I$, I is the identity matrix, and $\delta$ is a large positive value. The fitting error $\Psi_k$ may be recursively computed as:

$$\Psi_k = \lambda(k-1)\Psi_{k-1}/k + (z_k - x_k \hat{A}_{k-1})(z_k x_k \hat{A}_{k-1})/k$$

In various embodiments, A may be a matrix or a vector, and this recursive solution works for either A being a matrix or a vector.

Conclusion

Figure 6:
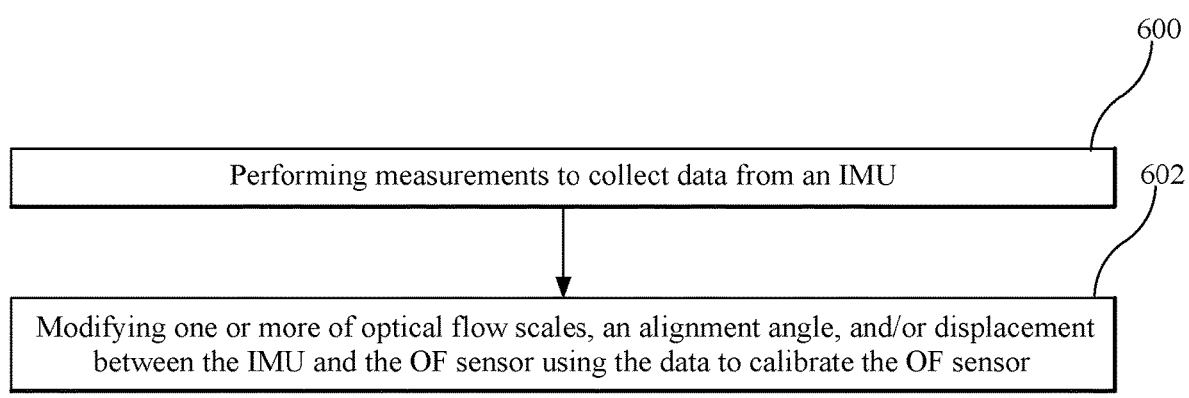
FIG. 6 is a flowchart illustrating a method according to an embodiment.

According to an embodiment, a method of calibrating an optical flow (OF) sensor by using an inertial measurement unit (IMU) in a robot system is shown in the flowchart of FIG. 6. Therein, at step 600, an IMU performs measurements to collect data. Then, at step 602, that data is used to calibrate the optical flow sensor, e.g., by calibrating one or more of optical flow scales, an alignment angle and/or displacement between the IMU and the OF sensor.

Figure 7:
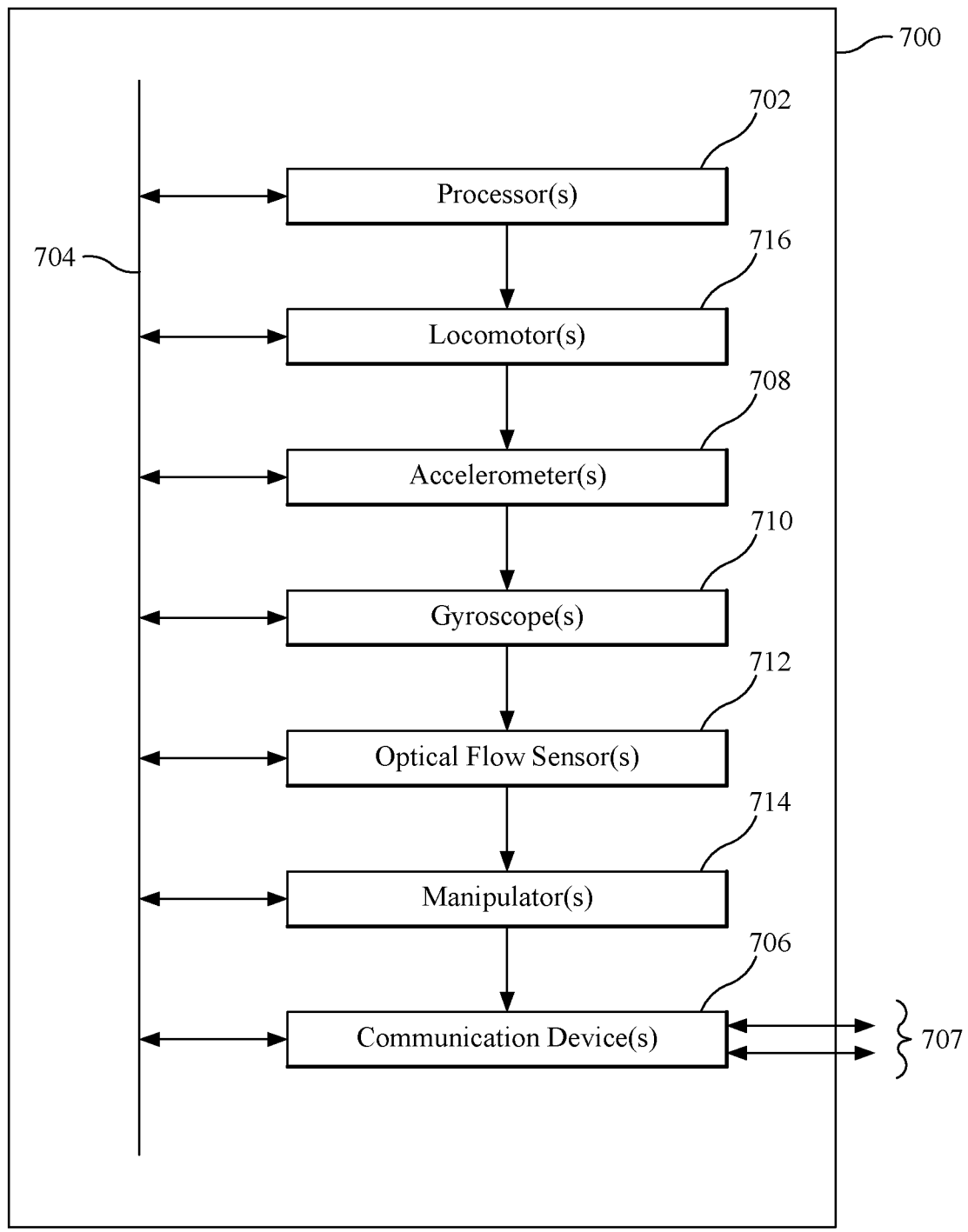
FIG. 7 is a robot system in which embodiments can be implemented.

An exemplary (but non-limiting) high level architecture of a robot 700 is shown in FIG. 7. Therein, the robot 700 may include, for example, one or more processors 702 including a system bus 704 which communicatively couples the processor(s) 702 to: (1) one or more communication devices 706 which enable communications with other devices via communications channels 707, (2) one or more preceptors/sensors including one or more accelerometers 708, one or more gyroscopes 710, one or more optical flow sensors 712, (3) one or more manipulators 714, and (4) one or more locomotors 716. The communication channels 707 may be adaptable to both wired and wireless communication, as well as supporting various communication protocols. By way of example and not limitation, the communication channels 707 may be configured as serial and/or parallel communication channels, such as, for example, USB, IEEE-1394, 802.11, BLE, cellular (e.g., LTE or 5G), and other wired and wireless communication protocols. If wireless communication channels are used, then the communication devices 706 will include a wireless transceiver and antenna (not shown in FIG. 7).

The preceptors may, for example, include any number of different sensors such as: optical sensors, inertial sensors (e.g., gyroscopes, accelerometers, etc.), thermal sensors, tactile sensors, compasses, range sensors, sonar, Global Positioning System (GPS), Ground Penetrating Radar (GPR), lasers for object detection and range sensing, imaging devices, magnetometers and the like. A preceptor could also be any other existing sensor within a deployment, that would otherwise be static, but could be mounted onto a robot to get the same data distributed across a facility, instead of from a single location (e.g., temperature or humidity sensors).

Furthermore, those skilled in the art will understand that many of these sensors may include both a source and a sensor to combine sensor inputs into meaningful, actionable perceptions. For example, sonar preceptors and GPR may generate sound waves or sub-sonic waves and sense reflected waves. Similarly, preceptors including lasers may include sensors configured for detecting reflected waves from the lasers for determining interruptions or phase shifts in the laser beam. Imaging devices suitable for use as an optical flow sensor 712 may be any suitable device for capturing images, such as, for example, an infrared imager, a video camera, a still camera, a digital camera, a Complementary Metal Oxide Semiconductor (CMOS) imaging device, a charge coupled device (CCD) imager, and the like. In addition, the imaging device may include optical devices for modifying the image to be captured, such as: lenses, collimators, filters, and mirrors. For adjusting the direction at which the imaging device is oriented, a robot 700 may also include pan and tilt mechanisms coupled to the imaging device.

The manipulators 714 may include, for example, vacuum devices, magnetic pickup devices, arm manipulators, scoops, grippers, camera pan and tilt manipulators, individual or coupled actuators, and the like. The locomotors 716 may include, for example, one or more wheels, tracks, legs, rollers, propellers, and the like. For providing the locomotive power and steering capabilities, the locomotors 716 may be driven by motors, actuators, levers, relays and the like. Furthermore, preceptors may be configured in conjunction with the manipulators 714 or locomotors 716, such as, for example, odometers and pedometers.

The foregoing discussion of FIG. 7 and hardware associated with a typical robot was adapted from U.S. Pat. No. 8,073,564, the disclosure of which is incorporated here by reference. Those skilled in the art will appreciate, however, that such elements are purely exemplary. Some robots will not include all of the elements illustrated in FIG. 7, whereas other robots may include hardware elements which do not fall into the categories depicted in FIG. 7. Nonetheless robots 700 can include the afore-described embodiments related to scale calibration.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a 3D pointing device or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the calibration as described above. According to other exemplary embodiments, some of the processing described above with respect to calibration may be performed in the device containing the sensors, while the remainder of the processing is performed in a second device after receipt of the partially processed data from the device containing the sensors.

Although the foregoing exemplary embodiments relate to calibration between an IMU and an OF sensor in a robot system, the calibration techniques according to these exemplary embodiments are not limited to only these types of sensors and/or components. For example, the calibration techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor (e.g., a camera, one or more photodiodes, one or more phototransistors), or other sensor combinations. Additionally, although exemplary embodiments described herein relate to calibration in the context of robots, robotic vacuum cleaners, and applications, such techniques are not so limited and may be employed in methods and devices associated with other applications, e.g., mobile phones, medical applications, gaming, cameras, military applications, robotic devices, etc.

The above-described exemplary embodiments are intended to be illustrative in all respects, rather than restrictive, of the present invention. Thus, the present invention is capable of many variations in detailed implementation that can be derived from the description contained herein by a person skilled in the art. For example, although the foregoing exemplary embodiments describe, among other things, the use of IMU measurements to calibrate OF sensor(s), other types of sensors (e.g., ultrasound, magnetic or optical) can be used instead of, or in addition to, IMU in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Appendix A.1. Derive $^I p^o(k)$ and $^I a^o(t)$

When the OF sensor frame and IMU frame are not aligned, there may exist a rotation matrix $R_{O \to I}$ to align them, for example, $$^I p^o(k) = R_{O \to I}{}^O p^o(k)$$

$$= R_{O \to I} R_{I \to U}(k)' \sum_{j=0}^{k} \left( R_{I \to U}(j) \Lambda *{}^O \Delta^o(k) \right) * \text{period}$$

$$= R_{I \to U}(k)' \sum_{j=0}^{k} \left( R_{I \to U}(j) R_{O \to I} \Lambda *{}^O \Delta^o(k) \right) * \text{period}$$

$$= R_{I \to U}(k)' \sum_{j=0}^{k} \left( R_{I \to U}(j) A *{}^O \Delta^o(k) \right) * \text{period}$$

For simplicity, the derivative in the continuous form is demonstrated, and denote $^O \Delta^o(t)$ as $\Delta(t)$.

$$^I a^o(t) = R_{O \to I} R_{I \to U}(t)' \frac{d R_{I \to U}(t) \Lambda \Delta(t)}{dt}$$

$$= R_{O \to I} \Lambda \dot\Delta(t) + R_{O \to I} R_{I \to U}(t)' \dot R_{I \to U}(t) \Lambda \Delta(t)$$

$$= R_{O \to I} \Lambda \dot\Delta(t) + R_{O \to I} \begin{bmatrix} 0 & \omega_z \\ -\omega_z & 0 \end{bmatrix} \Lambda \Delta(t)$$

$$= A \dot\Delta(t) + \begin{bmatrix} 0 & \omega_z \\ -\omega_z & 0 \end{bmatrix} A \Delta(t)$$

Note $R_{I \to U}(t)' \dot R_{I \to U}(t) = \begin{bmatrix} 0 & \omega_z \\ -\omega_z & 0 \end{bmatrix}$, and $R_{I \to U}(t) \begin{bmatrix} 0 & \omega_z \\ -\omega_z & 0 \end{bmatrix} = \begin{bmatrix} 0 & \omega_z \\ -\omega_z & 0 \end{bmatrix} R_{I \to U}(t)$

What is claimed:

1. A method of calibrating an optical flow (OF) sensor by using an inertial measurement unit (IMU) in a robot system, the method comprising:
   performing measurements to collect data from an IMU; and
   modifying one or more of optical flow scales, an alignment angle, and/or displacement between the IMU and the OF sensor using the data to calibrate the OF sensor,
   wherein the step of calibrating optical flow scales, an alignment angle, and/or displacement between the IMU and the OF sensor further comprises:
   using fminsearch and/or a Least Squares (LS) process in one or more formulations, via at least a formulation of a rigid body equation in a predetermined domain and a predetermined frame.

2. The method of claim 1, wherein the IMU measures a linear acceleration and/or an angular velocity.

3. The method of claim 1, wherein the IMU obtains an angular position.

4. The method of claim 1, wherein the predetermined domain is an acceleration domain, a velocity domain, and/or a position domain.

5. The method of claim 1, wherein the predetermined frame is a body frame or a user frame.

6. The method of claim 1, wherein the calibrating comprises:
   relating IMU and OF sensor measurements through the rigid body equation in a body frame and a velocity domain.

7. The method of claim 1, wherein the calibrating comprises:
   receiving, from the IMU, a first signal including a linear acceleration;
   receiving, from the OF sensor, a second signal including a velocity of the robot system;
   receiving, from the IMU, a third signal including a vector generated based on an angular velocity and a known vector;
   after rotating to a user frame, applying a first set of direct-current (DC) block filters to the first signal, the second signal, and the third signal; and
   integrating the linear acceleration in the user frame.

8. The method of claim 7, further comprising:
   after integrating the linear acceleration in the user frame, applying a second set of DC block filters to the first signal, the second signal, and the third signal; and rotating to a body frame.

9. The method of claim 8, wherein the first set and the second set of DC block filters have one or more same DC block filters.

10. The method of claim 1, wherein the calibrating comprises:
    receiving, from the IMU, a first signal including a linear acceleration;
    receiving, from the OF sensor, a second signal including a velocity of the robot system;
    receiving, from the IMU, a third signal including an angular velocity;
    applying a first set of direct-current (DC) block filters to at least the first signal and the second signal in a body frame;
    integrating the linear acceleration in the body frame;
    rotating the integrated linear acceleration and the velocity to a user frame; and
    applying a second set of DC block filters to at least the first signal and the second signal after the integration and the rotation.

11. The method of claim 10, further comprising:
    applying the first set and/or the second set of DC block filters to the third signal in the body frame.

12. The method of claim 10, wherein the first set and the second set of DC block filters have one or more same DC block filters.

13. The method of claim 10, further comprising:
    after rotating the integrated linear acceleration and the velocity to the user frame and applying the second set of DC block filters to at least the first signal and the second signal after the integration and the rotation, rotating at least the integrated linear acceleration and the velocity back to the body frame.

14. The method of claim 1, wherein the calibrating comprises obtaining calibration parameters to calibrate the OF sensor.

15. The method of claim 14, wherein the calibration parameters include one or more kinematic parameters being estimated from at least the formulation of the rigid body equation.

16. The method of claim 1 further comprising:
    determining whether a quality of matching of the data output from the IMU and the data output from the OF sensor is above a threshold; and calibrating the OF sensor using the data output from the IMU only when the quality of matching is above the threshold.

17. A robot system comprising an optical flow (OF) sensor and an inertial measurement unit (IMU) implementing the method of claim 1.

18. An apparatus comprising a processor, a transceiver, and one or more sensors implementing the method of claim 1.

* * * * *